United States Patent
Neubecker et al.

(10) Patent No.: US 10,587,992 B2
(45) Date of Patent: Mar. 10, 2020

(54) FILTERING A DSRC BROADCAST BASED ON USER-DEFINED PREFERENCES

(71) Applicant: Ford Global Technologies, LLC, Dearborn, MI (US)

(72) Inventors: Cynthia M. Neubecker, Westland, MI (US); Jayanthi Rao, West Bloomfield, MI (US); Anthony Gerald King, Ann Arbor, MI (US); James Andrew Miloser, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/080,979

(22) PCT Filed: Mar. 1, 2016

(86) PCT No.: PCT/US2016/020181
§ 371 (c)(1),
(2) Date: Aug. 29, 2018

(87) PCT Pub. No.: WO2017/151108
PCT Pub. Date: Sep. 8, 2017

(65) Prior Publication Data
US 2019/0098462 A1    Mar. 28, 2019

(51) Int. Cl.
*H04W 4/23* (2018.01)
*G06Q 30/02* (2012.01)
(Continued)

(52) U.S. Cl.
CPC .......... *H04W 4/23* (2018.02); *G06Q 30/0251* (2013.01); *H04W 4/06* (2013.01); *H04W 4/40* (2018.02); *H04W 4/80* (2018.02)

(58) Field of Classification Search
CPC .......... G06Q 30/0261; G06Q 30/0267; G06Q 30/02; G06Q 20/3224; G06Q 30/0236;
(Continued)

(56) References Cited

U.S. PATENT DOCUMENTS 9,047,772 B2   6/2015   Goto et al.
9,135,612 B1 *  9/2015   Proctor, Jr. .......... G06Q 20/202
(Continued)

FOREIGN PATENT DOCUMENTS

CN      103546578 A    1/2014
IN    1972/MUM/2014 A    1/2015
(Continued)

OTHER PUBLICATIONS

Association of Radio Industries and Businesses, "Dedicated Short-Range Communication (DSRC) Basic Application Interface," Association of Radio Industries and Businesses (ARIB) Standard, Version 1.0, published in Tokyo, Japan, dated Dec. 18, 2012, pp. 1-287. Retreieved from: www.arib.or.jp/english/html/overview/doc/7-TR-T22v1_0-E1.pdf.
(Continued)

*Primary Examiner* — Golam Sorowar
(74) *Attorney, Agent, or Firm* — Gregory P. Brown; Brooks Kushman P.C.

(57) ABSTRACT

A broadcast filtering system for a vehicle includes a controller programmed to, in response to receiving a commercial offering from a broadcasting business via a dedicated short-range network broadcast and identifying a match between a classification associated with the business and a user-defined preferred classification associated with the vehicle, display the offering, and, in response to identifying no match between the respective classifications, prevent the display.

12 Claims, 5 Drawing Sheets

(51) Int. Cl.
*H04W 4/80* (2018.01)
*H04W 4/40* (2018.01)
*H04W 4/06* (2009.01)

(58) Field of Classification Search
CPC ........... G06Q 30/0255; G06Q 30/0205; G06Q 30/0224; G06Q 30/0233; G06Q 30/0256; G06Q 30/0282; G06Q 30/0241; G06Q 30/0265; G06Q 30/0266; G06Q 30/0269; G06Q 20/20; G06Q 20/32; H04W 4/02; H04W 4/80; H04W 4/029; H04W 4/023; H04W 4/025; H04W 4/04; H04W 4/20; H04W 4/021; H04W 8/005; H04W 4/21; H04W 76/11; H04W 4/008; H04W 4/185; H04W 76/14; H04W 84/12; H04W 88/02; H04W 4/046; H04L 67/18; H04L 67/22; H04L 67/306; H04L 67/12; H04L 67/20; H04L 67/1025; H04L 67/2847; H04L 67/303
See application file for complete search history.

(56) References Cited

U.S. PATENT DOCUMENTS

| | | |
|---|---|---|
| 2003/0018536 A1 | 1/2003 | Eggebraaten et al. |
| 2007/0061057 A1 | 3/2007 | Huang et al. |
| 2010/0280956 A1 | 11/2010 | Chutorash et al. |
| 2013/0216102 A1* | 8/2013 | Ryan ........................ G06K 9/46 382/105 |
| 2014/0240089 A1* | 8/2014 | Chang ................. G07C 9/00111 340/5.61 |
| 2014/0344062 A1* | 11/2014 | Lamont .............. G06Q 30/0267 705/14.64 |
| 2017/0032402 A1* | 2/2017 | Patsiokas ........... G06Q 30/0266 |

FOREIGN PATENT DOCUMENTS

| | | | |
|---|---|---|---|
| JP | 2004118783 A | 4/2004 | |
| JP | 3726030 B2 | 12/2005 | |
| JP | 2010039866 | * 2/2010 | ............... C08G 1/09 |

OTHER PUBLICATIONS

Nick Vivion, "GM Adds Hotel and Restaurant Reservations to In-Vehicle System," published Jan. 5, 2015, 2 pages. Retrieved from: https://www.tnooz.com/article/move-priceline-gm-adds-hotel-restaurant-reservations-vehicle-system/.

International Search Report for PCT/US2016/020181 dated May 5, 2016, 2 pages.

* cited by examiner

US 10,587,992 B2

FILTERING A DSRC BROADCAST BASED ON USER-DEFINED PREFERENCES

CROSS-REFERENCE TO RELATED APPLICATION

This application is the National Phase entry of PCT application PCT/US2016/20181, filed Mar. 1, 2016, the disclosure of which is incorporated in its entirety by reference herein.

TECHNICAL FIELD

The present disclosure relates to systems and methods for filtering a dedicated short-range communications (DSRC) network broadcast based on one or more user restrictions, user preferences, and/or user-specific attributes.

BACKGROUND

A vehicle may be configured to establish a wireless network connection using a variety of network types. In one example, the vehicle may be configured to accept a DSRC broadcast using a DSRC network connection. A DSRC network uses one-way or two-way short-to medium-range wireless communication channels specifically designed for automotive use and a corresponding set of protocols and standards. The DSRC and its wireless component, wireless access in vehicular environments (WAVE) protocol, operate within the allocated 75-megahertz (MHz)-bandwidth of the 5.9 gigahertz (GHz) frequency spectrum band. The allocated bandwidth is divided into one control channel (CCH) and four to six service channels (SCHs).

SUMMARY

A broadcast filtering system for a vehicle includes a controller programmed to, in response to receiving a commercial offering from a broadcasting business via a dedicated short-range network broadcast and identifying a match between a classification associated with the business and a user-defined preferred classification associated with the vehicle, display the offering, and, in response to identifying no match between the respective classifications, prevent the display.

A method for a vehicle includes, in response to receiving by a controller a commercial offering and a classification from a broadcasting business via a dedicated short-range network broadcast and identifying a match between the classification and a user-defined preferred classification associated with the vehicle, displaying the offering, and, in response to identifying no match between the respective classifications, preventing the displaying.

A vehicle controller includes input channels configured to receive a commercial offering and a classification from a broadcasting business via a dedicated short-range network broadcast, output channels configured to provide signals to display the offering, and control logic configured to, in response to identifying a match between the classification and a user-defined preferred classification associated with the vehicle, generate the signals.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
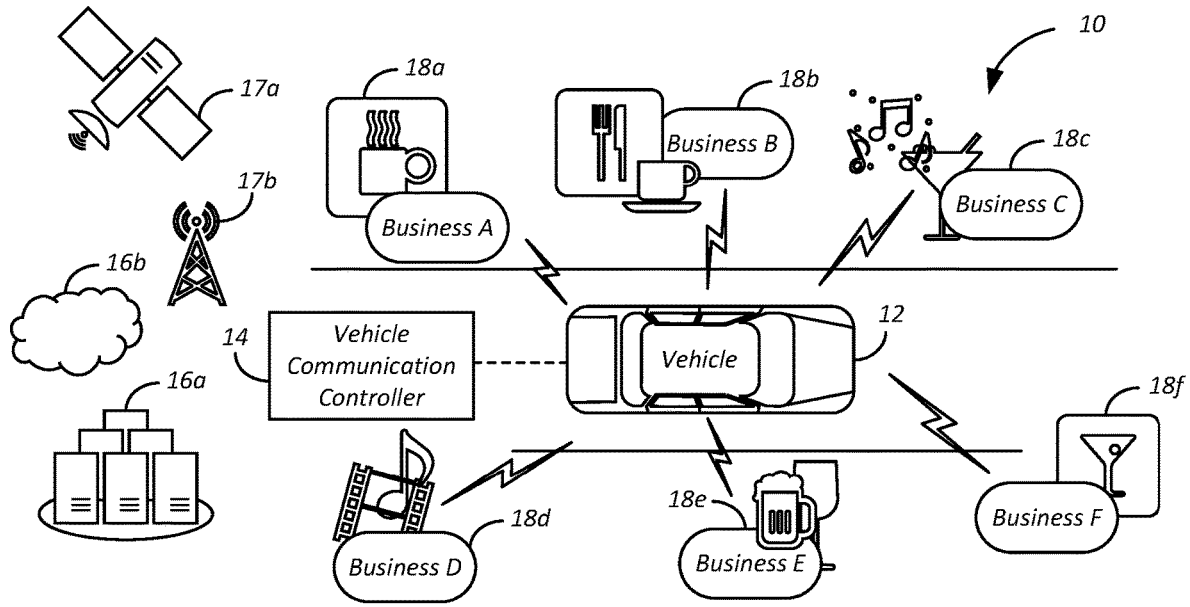
FIG. 1 is a block diagram illustrating a vehicle configured to receive via a DSRC broadcast a notification indicative of a commercial offering.

In reference to FIG. 1, a vehicle-to-infrastructure (V2I) communication system 10 is shown. The V2I communication system 10 uses a wireless network connection to enable communication between a broadcasting infrastructure (hereinafter, broadcasting business) 18 and a vehicle 12. In one example, the vehicle 12 is configured to communicate with the broadcasting business 18 using one or more of a plurality of wireless networks 16 providing digital network access via fixed or moving signal sources 17, such as, but not limited to, satellites, base stations, relay stations, access points, routers, ground stations, gateways, and so on. The broadcasting business 18 and the vehicle 12 may each include an antenna (not shown) configured to transmit and receive communications via one or more wireless network connections.

The broadcasting business 18 may be representative of a business, a commercial entity, an enterprise, or another type of organization broadcasting one or more commercial offers, advertisements, promotions, or other notices. In one example, the broadcasting business 18 may be configured to broadcast, using a dedicated short-range communications (DSRC) network connection, to the vehicle 12 one or more notifications indicative of a commercial offering.

The DSRC network uses one-way or two-way short-to medium-range wireless communication channels specifically designed for automotive use and a corresponding set of protocols and standards. The DSRC and its wireless component, wireless access in vehicular environments (WAVE) protocol, operate within the allocated 75-megahertz (MHz)-bandwidth of the 5.9 gigahertz (GHz) frequency spectrum band. The allocated bandwidth is divided into one control channel (CCH) used to broadcast safety messages and announce available services and four to six service channels (SCHs) used for subsequent communication between the broadcasted service provider and a service user.

Messages between the broadcasting business 18 and the vehicle 12 may be delivered using at least two communication protocols—the Internet Protocol version 6 (IPv6) and WAVE short messages protocol (WSMP). The DSRC protocol's use of IPv6 is unique in that it does not rely on MAC or IP addresses to make a connection with a vehicle within its signal range. Instead, the DSRC connection enables the broadcasting business 18 to advertise at least one service identified by a unique provider service identifier (PSID) without first establishing a connection with the vehicle 12.

The vehicle 12 may include a vehicle communication controller (hereinafter controller) 14 configured to receive a notification indicative of one or more DSRC broadcasts and determine whether the received broadcast matches one or more user-defined restrictions, preferences, and/or user-specific attributes. The controller 14 may be further configured to display one or more commercial offerings according to one or more user-defined restrictions, preferences, and/or user-specific attributes.

Figure 2:
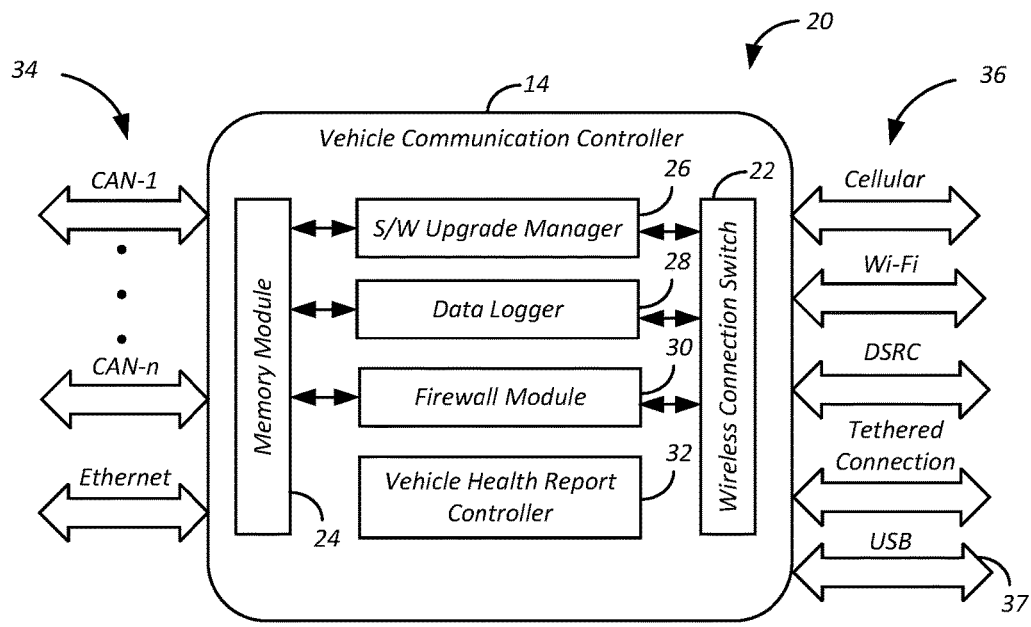
FIG. 2 is a block diagram illustrating a vehicle communication controller configured to receive DSRC broadcasts.

In reference to FIG. 2, an example configuration 20 of the controller 14 configured to receive a commercial offering via a DSRC broadcast is shown. The controller 14 is configured to communicate with a vehicle data bus 34 (e.g., a CAN bus) that provides access to various other vehicle controllers (not shown), such as an engine controller, a navigation controller comprising a Global Positioning System (GPS) receiver, and others. In some embodiments, the controller 14 may be integrated within a smart data link connector or within a telecommunications module of the vehicle 12.

The controller 14 may include a wireless connection switch 22 configured to communicate using one or more wireless network connections 36, such as cellular, Wi-Fi, DSRC, tethered and other connections. The controller 14 may be configured to transmit and receive digital data using various types of wireless networks including, but not limited to, wireless personal area networks (WPANs), wireless local area networks (WLANs), wireless mesh networks, wireless metropolitan area networks (WMANs), wireless wide area networks (WWANs), cellular networks, global area networks (GAN), DSRC, networks using tethered connections, and so on. The controller 14 may transmit and receive digital data using any number of associated communication protocols, such as, but not limited to, GSM (2G), ITU IMT-2000 (3G), IMT-Advanced (4G), IEEE 802.11a/b/g/n (Wi-Fi), WiMax, ANT™, ZigBee®, Bluetooth®, Near Field Communications (NFC), and others.

The controller 14 may comprise a memory module 24 including a non-persistent storage, e.g., random access memory (RAM), and persistent storage, a hard disk drive (HDD) or flash memory. The controller 14 may be further configured to access one or more external memory devices 37, such as, but not limited to, magnetic, optical, or solid state storage devices, flash memory devices, e.g., universal serial bus (USB) flash drive, hard disks, and so on.

The controller 14 may further include a software upgrade manager 26 configured to detect and install available software updates via the vehicle data bus 34, a data logger 28 configured to capture and record data flow of the controller 14, and a firewall module 30 configured to monitor and filter network traffic to prevent a malicious intrusion. In one example, the controller 14 may include an ID and threat reporting module (not shown) configured to prevent threats and damage using encryption, e.g., WPA/WEP keys, and other security methods. The controller 14 may further include a vehicle health report (VHR) controller 32 configured to detect vehicle diagnostic conditions, determine their severity, and generate a vehicle health report for an owner of the vehicle 12.

The controller 14 may comprise (or be in communication with) a visual front end interface (shown generally as controller 14), such as a built-in vehicle navigation display. The visual front end interface may be configured to receive a user input via, for example, a touch sensitive screen. The visual front end interface may be further configured to receive input through, among other means, button presses, gestures, audible speech, and speech synthesis. The visual front end interface of the vehicle 12 is configured to receive input indicative of one or more user-defined preferences, restrictions, and/or user-specific attributes. The visual front end may be further configured to display one or more commercial offerings received via DSRC network connection according to one or more user-defined restrictions, preferences, and/or user-specific attributes.

The controller 14 is configured to determine (using, for example, a unique PSID associated with the DSRC broadcast) whether a commercial offering included with the broadcast matches one or more user-defined restrictions, preferences, and/or user-specific attributes. In one example, the controller 14 may determine whether a commercial offering matches one or more user-defined restrictions, preferences, and/or user-specific attributes using a unique PSID associated with the broadcast. The controller 14 is further configured to display, e.g., via the visual front end interface, the broadcasted commercial offering according to one or more user-defined restrictions, preferences, and/or user-specific attributes.

The controller 14 may be configured to receive input indicative of selected preferences, restrictions, and/or attributes for one or more of a plurality of users of the vehicle 12. The users of the vehicle 12 may be identified, for example, using a unique ID associated with one or more wireless transmitters in communication with the controller 14. In one example, the controller 14 may be configured to receive input, e.g., via the visual front end interface, indicative of one or more user-defined preferences, restrictions, and/or user-specific attributes and to associate the selections with at least one wireless transmitter used with the vehicle 12. The controller 14 may enable one or more user-defined preferences, restrictions, and/or attributes associated with the unique ID when the wireless transmitter is inside or is used to start the vehicle 12. The controller 14 may display one or more commercial offerings broadcasted via DSRC network that match one or more enabled user-defined preferences, restrictions, and/or user-specific attributes.

Figure 3A:
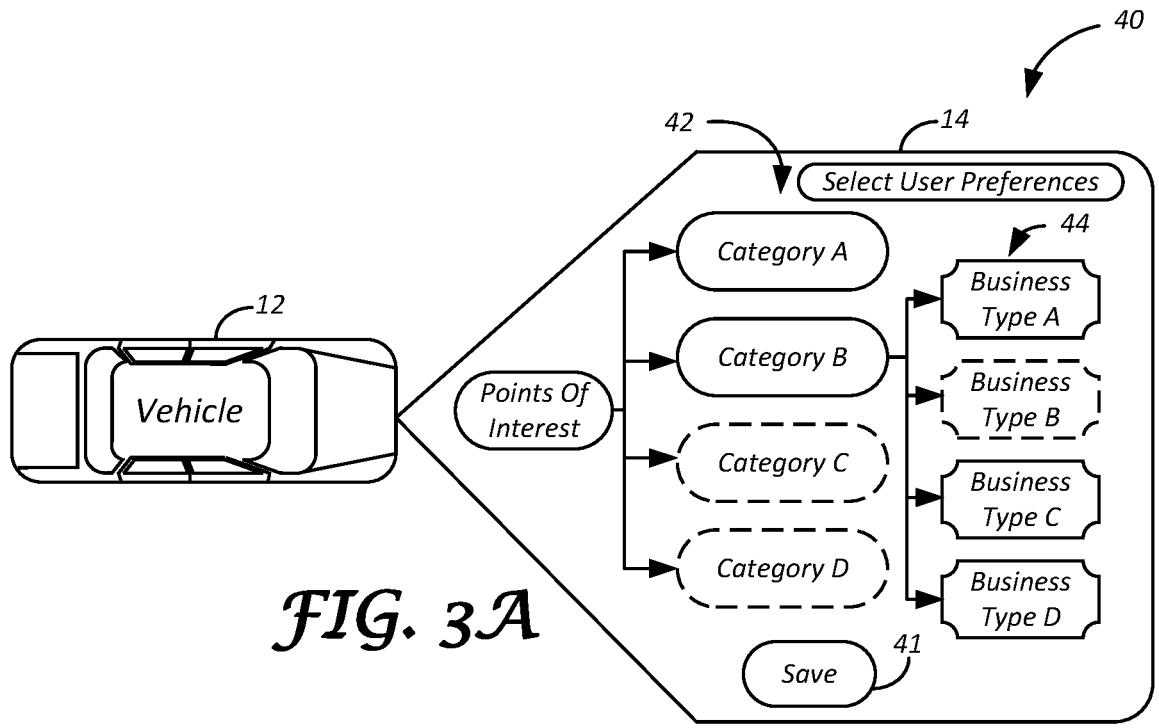
FIG. 3A is a block diagram illustrating a vehicle communication controller configured to receive input indicative of user-defined preferences regarding a category of business and business type.

In reference to FIG. 3A, a DSRC network communication system 40 is shown. The controller 14 of the vehicle 12 is configured to receive input, e.g., via a visual front end interface, indicative of one or more user-defined preferences. In one example, the controller 14 may be configured to display a solid outline around one or more selections a user indicated as desirable and display a dashed outline around one or more selections a user indicated as undesirable. In one example, the controller 14 may save, such as in response to a save button 41 press, the selected preferences in the memory module 24 and/or the one or more external memory devices 37.

In one example, user-defined preferences may define one or more classifications of businesses, such as, for example, one or more categories 42, identifying one or more businesses from which a user would like to receive commercial offerings via a DSRC broadcast. The categories 42 may include categories of businesses, such as, but not limited to, dining, entertainment, vehicle fuel and maintenance, banking, postal services, shopping, health services, and so on. While FIG. 3A shows the classifications as one or more categories in a particular arrangement, other layouts, arrangements, and configurations as well as examples of classifications are also contemplated.

One or more user-defined preferences may further include selecting a classification of businesses, such as, one or more types of businesses 44 within respective categories 42, from which a user would like to receive commercial offerings via a DSRC broadcast. In one example, a dining category of businesses may include various types of cuisines, e.g., French, American, Mexican, and so on, businesses supporting various types of dietary preferences, e.g., vegetarian, vegan, gluten-free, and so on, or various types of service, e.g., fast-food, drive-thru, dine-in, and so on. In another example, an entertainment category of businesses may include venue types featuring performing arts, comedy, music, and others.

Figure 3B:
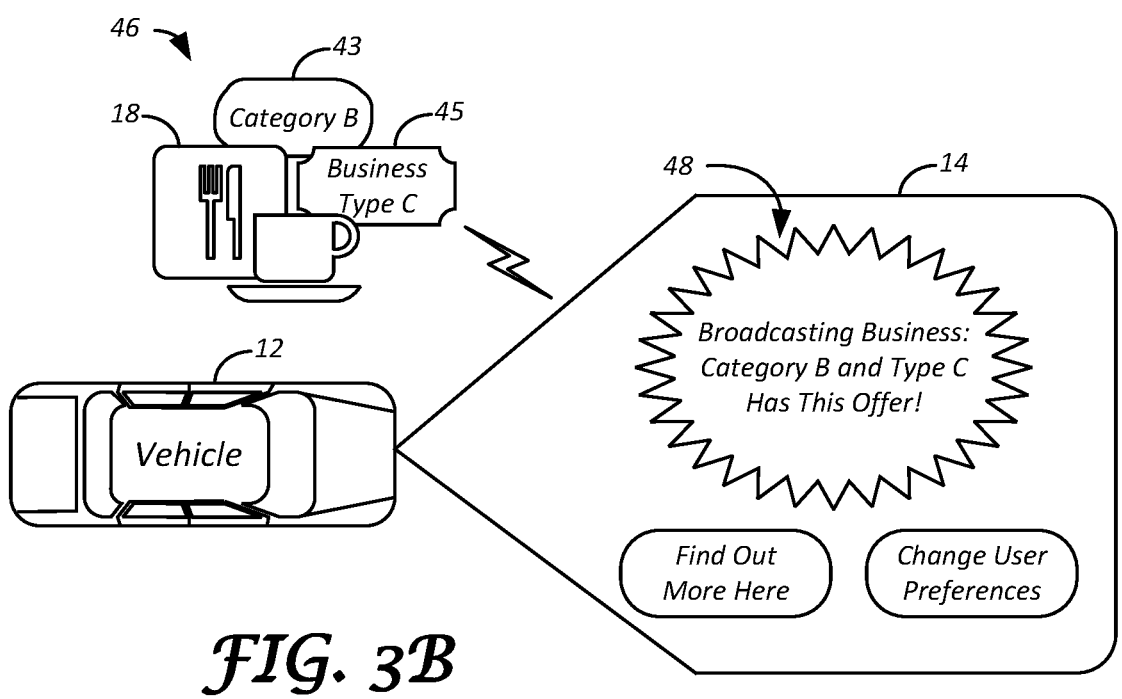
FIG. 3B is a block diagram illustrating a vehicle communication controller configured to display a commercial offering from a broadcasting business having category and type that match user-defined preferences.

As illustrated in FIG. 3B, the controller 14 may be configured to receive a DSRC broadcast 46 from the broadcasting business 18 indicative of one or more commercial offerings. The controller 14 may be configured to identify, using, for example, a unique PSID associated with the DSRC broadcast 46, one or more categories 43 and/or business types 45 associated with the broadcasting business 18. The controller 14 may be configured to compare the one or more categories 43 and/or business types 45 associated with the broadcasting business 18 to one or more categories 42 and/or business types 44 indicated as desirable through user-defined preferences. The controller 14 may be configured to display, such as via a visual front end interface, one or more commercial offerings 48 from the broadcasting business 18 associated with one or more categories 43 and/or business types 45 that match one or more categories 42 and/or business types 44 indicated as desirable.

Figure 4A:
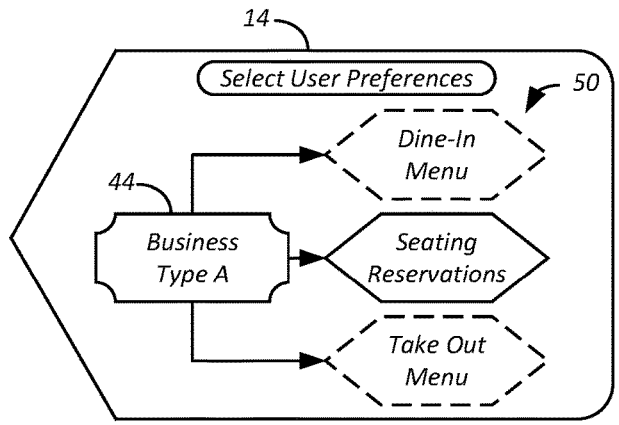
FIGS. 4A-4B are block diagrams illustrating a controller configured to receive input indicative of user-defined preferences regarding services associated with a business type.
Figure 4B:
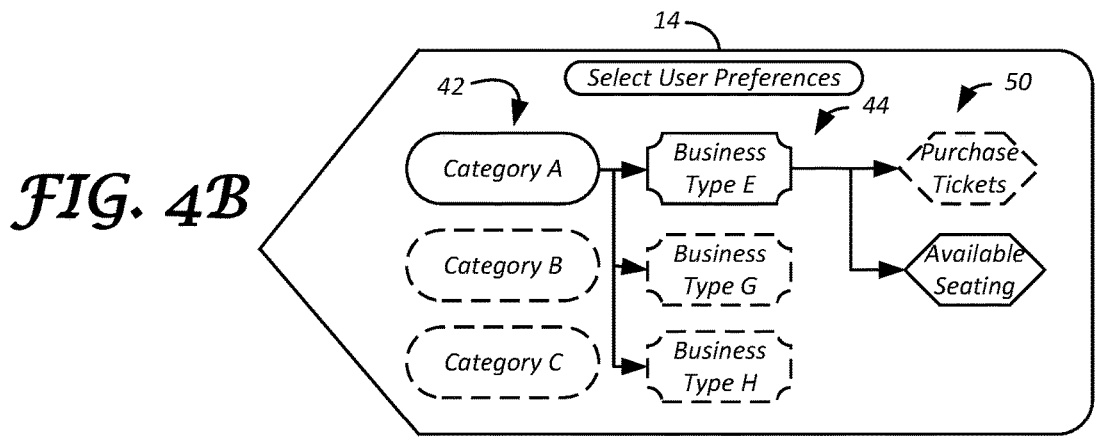

In reference to FIG. 4A, the controller 14 of the vehicle 12 is configured to receive input indicative of user-defined preferences regarding a classification, such as one or more services 50 associated with the business type 44. In one example, a dine-in business type may offer services 50 including, but not limited to, dine-in and take-out menus, seating reservations and so on. In another example, as shown in FIG. 4B, a performing arts business type may offer services 50 including, but not limited to, purchase tickets, available seating, and so on. Upon receipt, the controller 14 may be configured to display one or more commercial offerings from the broadcasting business associated with one or more services that match one or more services 50 indicated as desirable through user-defined preferences.

In one example, the controller 14 may be configured to receive from the broadcasting business 18 additional information associated with the services 50 indicated as desirable, such as, but not limited to, menus, seating charts, reservation availability, payment options, and so on. In such an example, the controller 14 may be configured to receive user input indicative of a request to submit a payment, purchase a ticket, make a reservation, and so on.

Figure 5:
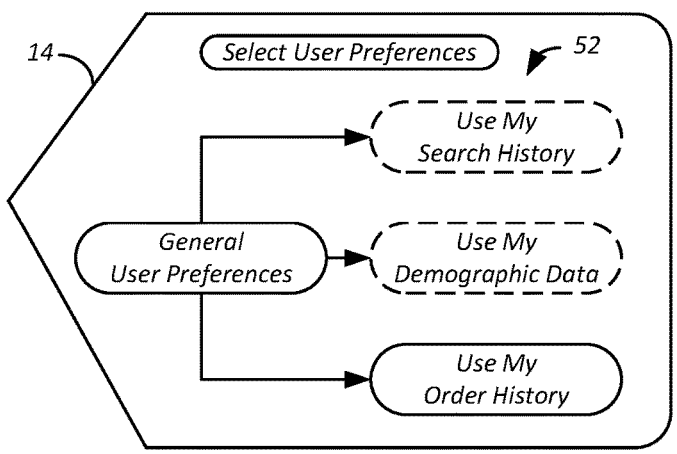
FIG. 5 is a block diagram illustrating a controller configured to receive input indicative of user preferences regarding stored data.

In reference to FIG. 5, the controller 14 of the vehicle 12 is configured to receive input, e.g., via a visual front end interface, indicative of one or more user-specific attributes 52. The controller 14 may be configured to display a solid outline around one or more attributes 52 selections that a user indicated as desirable and display a dashed outline around one or more attributes 52 selections that a user indicated as undesirable. While FIG. 5 shows the one or more user-specific attributes 52 in a particular arrangement, other layouts, arrangements, and configurations are also contemplated.

The user-specific attributes 52 may include, but are not limited to, one or more attributes cached, manually entered, keyed, and other data previously used and/or unique to the user. In one example, the one or more user-specific attributes 52 may include cached search engine entries, keyed-in demographic data, order history data, and so on. One or more parameters defining the user-specific attributes 52, e.g., user previous order history associated with one or more categories and/or business types, may be stored on the one or more external memory devices 37 accessible to the controller 14.

The controller 14 may be configured to determine, using classifications, such as, for example, associated categories and/or business types, whether one or more user-specific attributes 52 apply to the broadcasting business 18. The controller 14 may supplement one or more broadcasted offerings using, for example, the parameters associated with the user-specific attributes 52 in response to determining that one or more user-specific attributes 52 apply. In one example, the controller 14 may add order history to the commercial offering received from the broadcasting business with which a user previously placed orders. The controller 14 is further configured to display the supplemented commercial offering.

Figure 6A:
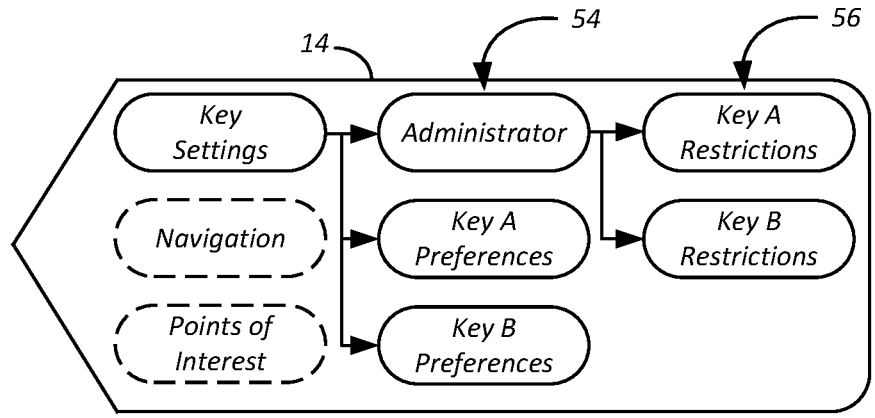
FIGS. 6A-6B are block diagrams illustrating a controller configured to receive input indicative of restrictions associated with at least one user of the vehicle.

In reference to FIG. 6A, the controller 14 may be configured to receive input, e.g., via the visual front end interface, indicative of one or more restrictions 56 associated with one or more users 54 of the vehicle 12. In one example, the controller 14 is configured to receive input from an administrative user selecting at least one restriction and to associate the selected restriction with at least one wireless transmitter used with the vehicle 12. Administrative user access may be key-, password-, or PIN-protected and not generally available to the users of the vehicle 12 not in possession of the key, password, or PIN.

Figure 6B:
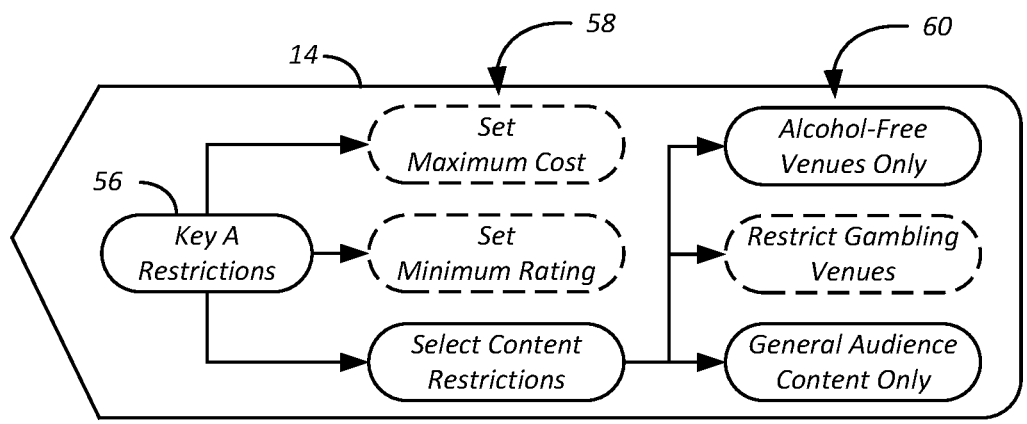

In reference to FIG. 6B, the one or more user-defined restrictions 56 may include classifications of restriction categories 58 such as, but not limited to, minimum and/or maximum cost, rating, content, location, and so on. The user-defined restrictions 56 may further include classifications defining one or more types of restrictions 60, such as, but not limited to, limitations on broadcasts from businesses selling alcohol or tobacco, venues offering gambling, venues offering age-inappropriate viewing content, and so on. The controller 14 may enable one or more user-defined restrictions 56, e.g., restriction categories 58 and/or types of restrictions 60, associated with the wireless transmitter that is inside or is used to start the vehicle 12. The controller 14 may be configured to display one or more commercial offerings broadcasted via a DSRC network that match, e.g., qualify as non-restricted content, the one or more enabled user-defined restrictions 56.

Figure 7:
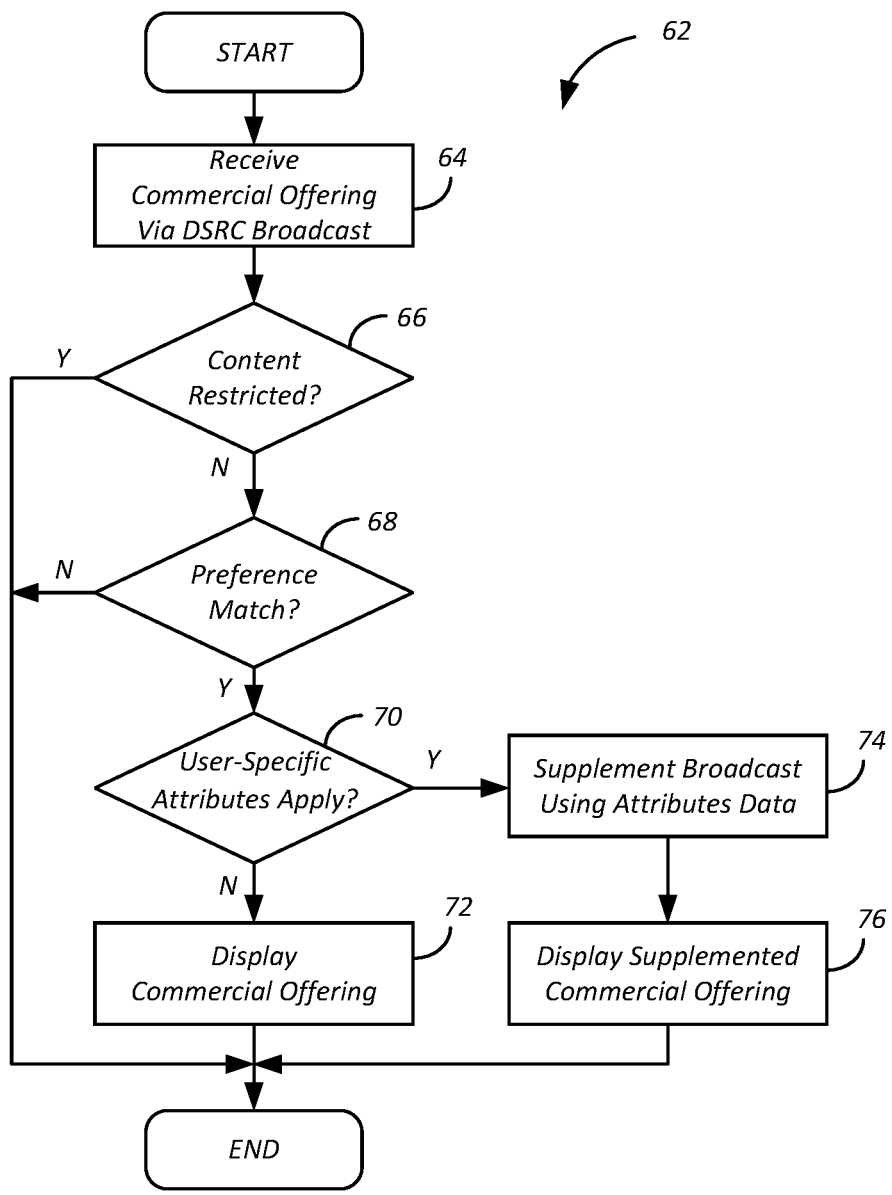
FIG. 7 is a flowchart illustrating an algorithm for filtering a DSRC broadcast based on one or more user-defined restrictions, preferences, and/or user-specific attributes.

In reference to FIG. 7, a control strategy 62 for receiving DSRC broadcasts from the broadcasting business 18 is shown. The control strategy 62 may begin at block 64 where the controller 14 receives a signal from the broadcasting business 18 indicative of a request to transmit a commercial offering via a DSRC connection.

At block 66 the controller 14 determines whether the broadcasting business 18 matches, e.g., qualifies as non-restricted content, the one or more user-defined restrictions 56. The controller 14 may compare, using, for example, a unique PSID associated with the DSRC broadcast, the one or more categories 43 and/or business types 45 associated with the broadcasting business 18 to one or more user-defined restrictions 56, e.g., restriction categories 58 and/or types of restrictions 60, associated with the vehicle 12. In one example, the controller 14 compares the one or more categories 43 and/or business types 45 associated with the broadcasting business 18 to one or more restrictions 56 associated with a wireless transmitter in vicinity of (or used to start) the vehicle 12.

The controller 14 may ignore the broadcast and exit the control strategy 62 in response to determining at block 66 that the one or more categories 43 and/or business types 45 associated with the broadcasting business 18 qualifies as restricted content relative to at least one user-defined restriction 56, e.g., restriction category 58 and/or type of restriction 60, associated with the vehicle 12. The controller 14 may proceed to block 68 in response to determining at block 66 that the one or more categories 43 and/or business types 45 associated with the broadcasting business 18 do not qualify as restricted content relative to the one or more user-defined restrictions 56, e.g., restriction category 58 and/or type of restriction 60, associated with the vehicle 12.

At block 68 the controller 14 determines whether the broadcasting business 18 matches the one or more user-defined preferences associated with the vehicle 12. The controller 14 may compare, using, for example, a unique PSID associated with the DSRC broadcast, the one or more categories 43 and/or business types 45 associated with the broadcasting business 18 to one or more categories 42 and/or business types 44 associated with the vehicle 12. In one example, the controller 14 compares the one or more categories 43 and/or business types 45 associated with the broadcasting business 18 to one or more categories 42 and/or business types 44 associated with a wireless transmitter in the vicinity of (or used to start) the vehicle 12.

The controller 14 may ignore the broadcast and exit the control strategy 62 in response to determining at block 68 that the one or more categories 43 and/or business types 45 associated with the broadcasting business 18 do not match at least one user-defined preference, e.g., categories 42 and/or business types 44, associated with the vehicle 12. The controller 14 may proceed to block 70 in response to determining at block 68 that the one or more categories 43 and/or business types 45 associated with the broadcasting business 18 match at least one category 42 and/or business type 44, associated with the vehicle 12.

At block 70 the controller 14 determines, using, for example, associated categories and/or business types, whether the one or more user-specific attributes 52 associated with the vehicle 12 apply to the broadcasting business 18. The controller 14 at block 72 displays the broadcasted commercial offering in response to determining at block 70 that none of the one or more user-specific attributes 52 apply to the broadcasting business 18.

The controller 14 at block 74 supplements one or more broadcasted offerings in response to determining that one or more user-specific attributes 52 apply. In one example, the controller supplements one or more broadcasted offerings using the parameters associated with the user-specific attributes 52 and stored on the one or more external memory devices 37. The controller 14 may, for example, add order history to the commercial offering received from the broadcasting business 18 with which a user previously placed orders. At block 76 the controller 14 displays the supplemented commercial offering. At this point the control strategy 62 may end. In some embodiments the control strategy 62, as described in reference to FIG. 7, may be repeated in response to receiving a notification indicative of a DSRC broadcast request or in response to another notification or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A broadcast filtering system for a vehicle comprising:
   a controller programmed to,
      in response to receiving a commercial offering from a broadcasting business via a dedicated short-range network broadcast and using a unique provider service identifier associated with the dedicated short-range network broadcast and indicative of the broadcasting business to identify a match between a classification associated with the business and a user-defined preferred classification associated with the vehicle, display the offering, in response to identifying the classification associated with the business as non-restricted among user-defined restriction classifications that include age and rating, display the offering, and in response to identifying no match between the classification associated with the business and the user-defined preferred classification, prevent the display.

2. The system of claim 1, wherein in response to identifying, the match, the controller is further programmed to supplement the offering according to at least one user-specific attribute and to display the supplemented offering.

3. The system of claim 2, wherein the applicable user-specific attribute defines a prior transaction with the broadcasting business and the supplemented offering includes details associated with the prior transaction.

4. The system of claim 2, wherein the applicable user-specific attribute is stored on an external memory device accessible to the controller.

5. The system of claim 1, wherein the classification associated with the business comprises a business category, a business type, or a business service.

6. The system of claim 5, wherein the business service defines making a purchase related to the broadcasted offering and the controller is further programmed to display a list of commands for completing the purchase.

7. A method for a vehicle comprising:
in response to receiving by a controller a commercial offering and a classification from a broadcasting business via a dedicated short-range network broadcast and to using a unique provider service identifier associated with the dedicated short-range network broadcast and indicative of the broadcasting business to identify a match between the classification and a user-defined preferred classification associated with the vehicle, displaying the offering;

in response to identifying by the controller the classification as non-restricted among user-defined restriction classifications that include age and rating, displaying the offering; and in response to identifying by the controller no match between the respective classifications, preventing the displaying.

8. The method of claim 7, further comprising, in response to identifying the match, supplementing the offering according to at least one user-specific attribute and displaying the supplemented offering.

9. The method of claim 8, wherein the applicable user-specific attribute defines a prior transaction with the broadcasting business and the supplemented offering includes details associated with the prior transaction.

10. The method of claim 8, wherein the applicable user-specific attribute is stored on an external memory device accessible to the controller.

11. The method of claim 7, wherein the classification comprises a business category, a business type, or a business service.

12. The method of claim 11, wherein the business service defines making a purchase related to the broadcasted offering and further comprising displaying a list of commands for completing the purchase.

* * * * *